United States Patent [19]

Schurdak et al.

[11] 3,966,675

[45] June 29, 1976

[54] THERMAL STABILIZERS FOR POLYPROPYLENE

[75] Inventors: Edward Joseph Schurdak, Somerville; Christos Savides, Piscataway, both of N.J.

[73] Assignee: American Cyanamid Company, Stamford, Conn.

[22] Filed: Nov. 11, 1974

[21] Appl. No.: 522,385

[52] U.S. Cl. ................ 260/45.8 NT; 260/45.85 H; 260/45.85 S; 252/406
[51] Int. Cl.² ............................................ C08J 3/20
[58] Field of Search .......... 260/45.85 H, 45.85 NT, 260/45.85 S; 252/406

[56] References Cited
UNITED STATES PATENTS

| | | | |
|---|---|---|---|
| 3,285,855 | 11/1966 | Dexter et al. | 260/45.85 |
| 3,723,427 | 3/1973 | Susi | 260/45.8 |
| 3,758,549 | 9/1973 | Dexter et al. | 260/45.85 |
| 3,810,929 | 5/1974 | Brook | 260/45.95 |

OTHER PUBLICATIONS

Chemistry and Industry — Feb. 16, 11963, pp. 271 to 281.

*Primary Examiner*—V. P. Hoke
*Attorney, Agent, or Firm*—Philip Mintz

[57] ABSTRACT

Mixtures of pentaerythritol tetrakis(3-n-dodecylthiopropionate) and either bis(4-t-butyl-3-hydroxy-2,6-dimethylbenzyl) dithiolterephthalate or 1,3,5-tris(4-t-butyl-3-hydroxy-2,6-dimethylbenzyl)-s-triazine-2,4,6-(1H,3H,5H)-trione are extremely useful for inhibiting thermal degradation of polypropylene.

5 Claims, No Drawings

THERMAL STABILIZERS FOR POLYPROPYLENE

This invention relates to stabilizing polypropylene against thermal degradation, i.e., degradation caused or accelerated by heating in the presence of air.

It is well known that polypropylene degrades on exposure to air at elevated temperatures. Various additives, used alone or in combinations, have been suggested to inhibit such thermal degradation in order to prolong the useful lives of articles made from polypropylene. Since none have been found to be completely satisfactory, research continues in order to find compounds or mixtures which will be ever better. The present invention arose out of such research and resulted in the discovery of certain mixtures which were superior inhibitors of thermal degradation of polypropylene.

In accordance with present invention, it has been discovered that mixtures of pentaerythritol tetrakis(3-n-dodecylthiopropionate) with either bis(4-t-butyl-3-hydroxy-2,6-dimethylbenzyl) dithiolterephthalate or 1,3,5-tris(4-t-butyl-3-hydroxy-2,6-dimethylbenzyl)-s-triazine-2,4,6-(1H,3H,5H)-trione are effective inhibitors of thermal degradation in polypropylene, much more effective than the closest similar mixtures found in the prior art.

These three compounds are all known compounds. Pentaerythritol tetrakis(3-n-dodecylthiopropionate) and a method for its preparation can be found in Example 4 of U.S. Pat. No. 3,758,549, which patent describes its use (in Example 5) in combination with certain hindered-phenol antioxidants to stabilize polypropylene against thermal degradation. Bis(4-t-butyl-3-hydroxy-2,6-dimethylbenzyl) dithiolterephthalate and a method for its preparation can be found in Example 8 of U.S. Pat. No. 3,810,929, which patent describes its use alone (in Example 11) or in combination with esters of thiodipropionic acid (column 4, lines 17–21) as an antioxidant to inhibit thermal degradation of polypropylene. 1,3,5-Tris(4-t-butyl-3-hydroxy-2,6-dimethylbenzyl)-s-triazine-2,4,6-(1H,3H,5H)-trione and a method for its preparation can be found in Example 1 of U.S. Pat. No. 3,723,427, which patent describes its use alone (in Example 2) or in combination with distearyl thiodipropionate (STDP in Example 3) to inhibit thermal degradation in polypropylene.

These compounds may be incorporated into polypropylene by any of the well-known procedures, such as milling, extruding, Banbury mixing, swelling, and the like. Preferably these compounds can be mixed together in the weight ratio of 2:1 to 1:10, preferably between 1:1 and 1:4, of either bis(4-t-butyl-3-hydroxy-2,6-dimethylbenzyl) dithiolterephalate or 1,3,5-tris(4-t-butyl-3-hydroxy-2,6-dimethylbenzyl)-s-triazine-2,4,6-(1H,3H,5H)-trione or mixtures thereof to pentaerythritol tetrakis(3-n-dodecylthiopropionate) prior to incorporating into the polypropylene, although they may be incorporated therein separately. For effective inhibition of thermal degradation, it is generally useful to incorporate 0.02 to 1 percent, preferably 0.05 to 0.5 percent, on weight of polypropylene of the bis(4-t-butyl-3-hydroxy-2,6-dimethylbenzyl) dithiolterephthalate or the 1,3,5-tris(4-t-butyl-3-hydroxy-2,6-dimethylbenzyl)-s-triazine-2,4,6-(1H,3H,5H)-trione or mixtures thereof and 0.1 to 1 percent, preferably 0.15 to 0.5%, on weight of polypropylene of the pentaerythritol tetrakis(3-n-dodecylthiopropionate) into the polypropylene. The polypropylene so stabilized may also contain other additives, such as dyes, foaming agents, plasticizers, pigments, light absorbers, etc. as is conventional practice.

The following examples illustrate some especially preferred embodiments of this invention and demonstrate the superiority thereof over the closest similar mixtures found in the prior art. In these examples, the compounds utilized will be identified as follows: BIS is bis(4-t-butyl-3-hydroxy-2,6-dimethylbenzyl) dithiolterephthalate;

TRIS is 1,3,5-tris(4-t-butyl-3-hydroxy-2,6-dimethylbenzyl)-s-triazine-2,4,6-(1H,3H,5H)-trione;

TDHP is pentaerythritol tetrakis[3-(3,5-di-t-butyl-4-hydroxyphenyl)propionate];

PTDP is pentaerythritol tetrakis(3-n-dodecylthiopropionate); and

STDP is distearyl thiodipropionate.

EXAMPLE 1

Test films were prepared by incorporating the additives into unstabilized polypropylene at the designated concentrations by milling at 170°–175°C. on a standard two-roll laboratory mill and then compression molding the milled material into films 15–20 mils thick at 200°C. The films were aged in a forced-draft oven at 150°C. and the efficiency for inhibiting thermal degradation was determined by noting the time in hours to embrittlement at this temperature. The results are shown in Table I.

Table I

| Test | Additives and Concentrations | Hours to Embrittlement |
|---|---|---|
| A | 0.1% BIS + 0.15% PTDP | 3465 |
| B | 0.1% BIS + 0.15% STDP | 1760 |
| C | 0.1% TDHP + 0.15% PTDP | 2488 |

This data shows that a composition of the present invention (Test A) is about 97% better than the composition of the closest combination suggested in U.S. Pat. No. 3,810,929 (Test B) and is about 40% better than the closest combination tested in U.S. Pat. No. 3,758,549, column 10 lines 6–10 (Test C).

EXAMPLE 2

Test plaques were prepared by incorporating the additives into unstabilized polypropylene at the designated concentrations by dry-blending overnight on a three-roll blender, followed by extruding the blended polymer at 217°–240°C. using a ¾ inch laboratory extruder. The extrudate is pelletized and injection molded at 250°C. to obtain plaques 60–65 mils thick. The plaques were aged in a forced-draft oven at 150°C. and the time in hours to embrittlement noted. The results are shown in Tables II and III.

Table II

| Test | Additives and Concentrations | Hours to Embrittlement |
|---|---|---|
| D | 0.05% TRIS + 0.175% PTDP | 4329 |
| E | 0.05% TRIS + 0.25% STDP | 3180 |
| F | 0.1% TDHP + 0.175% PTDP | 2715 |

This data shows that a composition of the present invention (Test D) is at least about 36% better than the closest combination tested in U.S. Pat. No. 3,723,427, column 4, lines 50–52 (Test E) and is at least about 60% better than the closest combination tested in U.S.

Pat. No. 3,758,549, column 10, line 6–10 (Test F). Actually, the composition of this invention (Test D) is somewhat better than indicated by this data in comparison to the prior art since the tests used concentrations which would have favored the prior art compounds. (In Test E, more STDP was used and in Test F, more TDHP was used than was used of the corresponding additives compared in Test D.)

Table III

| Test | Additives and Concentrations | Hours to Embrittlement |
|------|------------------------------|------------------------|
| X    | 0.1% BIS + 0.175% PTDP       | 5170                   |
| Y    | 0.1% BIS + 0.25% STDP        | 3415                   |
| Z    | 0.1% TDHP + 0.175% PTDP      | 2715                   |

This data shows that a composition of the present invention (Test X) is at least about 51% better than the composition of the closest combination suggested in U.S. Pat. No. 3,810,929 (Test Y) and is about 90% better than the closest combination tested in U.S. Pat. No. 3,758,549 column 10, lines 6–10 (Test Z).

We claim:

1. A stabilizer composition useful in the synergistic enhancement of the resistance of polypropylene to thermal degradation comprising, in combination, pentaerythritol tetrakis(3-n-dodecylthiopropionate) and either bis(4-t-butyl-3-hydroxy-2,6-dimethylbenzyl) dithiolterephthalate or 1,3,5-tris(4-t-butyl-3-hydroxy-2,6-dimethylbenzyl)-s-triazine-2,4,6-(1H,3H,5H)-trione.

2. A composition comprising polypropylene and a stabilizing amount of the stabilizer composition of claim 1.

3. A stabilizer composition as defined in claim 1 wherein the weight ratio of said bis(4-t-butyl-3-hydroxy-2,6-dimethylbenzyl) dithiolterephthalate or 1,3,5-tris(4-t-butyl-3-hydroxy-2,6-dimethylbenzyl)-s-triazine-2,4,6-(1H, 3H, 5H)-trione or mixtures thereof to said pentaerythritol tetrakis(3-n-dodecylthiopropionate) is between 2:1 and 1:10.

4. A composition comprising polypropylene and a stabilizing amount of the stabilizer composition of claim 3.

5. A composition as defined in claim 2 wherein said stabilizing amount comprises 0.02 to 1 percent, on weight of polypropylene, of said bis(4-t-butyl-3-hydroxy-2,6-dimethylbenzyl) dithiolterephthalate or said 1,3,5-tris-(4-t-butyl-3-hydroxy-2,6-dimethylbenzyl)-s-triazine-2,4,6-(1H, 3H, 5H)-trione or mixtures thereof and 0.1 to 1 percent, on weight of polypropylene, of said pentaerythritol tetrakis(3-n-dodecylthiopropionate).

* * * * *